United States Patent [19]

Kojima

[11] 4,129,449

[45] Dec. 12, 1978

[54] SOIL-HARDENING COMPOSITION

[76] Inventor: Shokichi Kojima, Yamazaki Danchia 6-9-208, No. 2130, Yamazaki-Cho, Machida City, Tokyo, Japan

[21] Appl. No.: 819,238

[22] Filed: Jul. 27, 1977

[30] Foreign Application Priority Data

Jul. 29, 1976 [JP] Japan .................................. 51-89681

[51] Int. Cl.$^2$ ............................................. C04B 7/355
[52] U.S. Cl. ...................................... 106/95; 106/98; 405/266
[58] Field of Search ........................... 106/95, 98, 314; 61/36 B

[56] References Cited

U.S. PATENT DOCUMENTS

| 2,901,368 | 8/1959 | Newell et al. | 106/95 |
|---|---|---|---|
| 3,769,051 | 10/1973 | Hardin | 106/95 |

*Primary Examiner*—James Poer
*Attorney, Agent, or Firm*—James E. Nilles

[57] ABSTRACT

A soil-hardening composition, which has a high dispersing effect and other excellent properties and can be used effectively in civil engineering works, for example, for modifying and strengthening a surface layer of a super-soft poor subsoil and improving physical and mechanical properties of a cohesive soil having a high water content and for hardening a humus soil, an alluvial soil, a deposited sludge and the like, is disclosed.

This composition comprises Portland cement and, incorporated therein, 0.2 to 0.8% by weight of at least one member selected from the group consisting of lignin sulfonate and their modified products and derivatives, 0.4 to 0.5% by weight of sodium tripolyphosphate, 0.2 to 0.3% by weight of calcium stearate, 1.5 to 2.0% by weight of calcium chloride and 0.5 to 1.0% by weight of a slag silica.

When 0.2 to 0.5% by weight of an alkylarylsulfonate, calcium aluminate or a triethanolamine ester is further incorporated into this soil-hardening composition, an effect of enhancing the speed of setting and hardening soils in cold districts can be attained.

4 Claims, No Drawings

SOIL-HARDENING COMPOSITION

The present invention relates to a soil-hardening composition for hardening soils for attaining various purposes in civil engineering works. More particularly, the invention relates to a soil-hardening composition which can attain such an effect of improving physical and mechanical properties of soils as cannot be attained by conventional physical means.

Various soil-hardening agents of this type are known in the art. For example, there can be mentioned soil-hardening agents disclosed in Japanese Patent Application Publications Nos. 24952/70 and 38682/72.

It is a primary object of the present invention to provide a soil-hardening composition which can be applied to road construction works, harbour construction works, works for preparing housing sites, river works and other engineering works broadly in various fields and can attain excellent effects that cannot be attained by conventional soil-hardening agents.

In accordance with the present invention, there is provided a soil-hardening composition comprising Portland cement and, incorporated therein, 0.2 to 0.8% by weight of at least one member selected from the group consisting of lignin sulfonate and their modified products and derivatives, 0.4 to 0.5% by weight of sodium tripolyphosphate, 0.2 to 0.3% by weight of calcium stearate, 1.5 to 2.0% by weight of calcium chloride and 0.5 to 1.0% by weight of a slag silica.

When 0.2 to 0.5% by weight of at least one member selected from the group consisting of alkylarylsulfonate, calcium aluminate and triethanolamine esters is further incorporated into the above soil-hardening composition, an effect of enhancing the speed of setting and hardening soils in cold districts can be attained.

An ideal chemical composition of Portland cement that is used as the main component of the present invention is as follows:

Ignition loss: 3.0% by weight
Insoluble component: 0.5% by weight
$SiO_2$: 22% by weight
$Al_2O_3$: 5.0% by weight
$Fe_2O_3$: 2.5% by weight
CaO: 61.0% by weight
MgO: 1.8% by weight
$SO_2$: 2.2% by weight In the present invention, however, any of commercially available Portland cements can be conveniently used.

A lignin sulfonate that is incorporated in the composition of the present invention is known as an anionic surface agent valuable as a water-reducing agent, a dispersant, a setting-retarding agent, a quick setting agent or the like. It is also known that because of a high dispersing activity, the lignin sulfonate makes it possible to reduce the unit amount of water required for obtaining a concrete having a prescribed plasticity. Accordingly, the lignin sulfonate provides a concrete having such excellent properties as increased strength and durability, improved water-tightness, reduced water permeability, improved resistance to chemicals such as acids and alkalis and reduced drying shrinkage. Further, sodium lignin sulfonate is dissociated in water into an anion of lignin sulfonic acid and a sodium cation. Accordingly, it exerts a strong ionic activity and manifests high wetting, permeating and adsorbing actions to cement particles. Therefore, when sodium lignin sulfonate is added to cement, it adheres onto surfaces of respective cement particles of coagulated agglomerates of cement to render them repellent to one another and disperse them, and the flowability of the entire system can be improved. Sodium lignin sulfonate manifests similar actions to soil particles and deposited sludge particles.

The molecular weight of the lignin sulfonate varies in a broad range of 400 to 700,000. The lignin sulfonate performs various actions depending on the amount incorporated. For example, it acts as a dispersant for particles and granules, as an emulsifier for liquids and as a stabilizer for bubbles.

Since the soil-hardening composition of the present invention contains 0.2 to 0.8% by weight of a lignin sulfonate or the like, even if a soil to be treated is a cohesive soil, there can be attained an effect of dividing agglomerated soil particles into respective particles. If the amount of the lignin sulfonate exceeds the upper limit of 0.8% by weight, the dispersing effect becomes too high and this high dispersing effect is maintained, and therefore, a treated soil is not set and it is impossible to harden and stabilize the soil. If the content of the lignin sulfonate is lower than the lower limit of 0.2% by weight, no sufficient dispersing effect can be attained and the flowability of the composition cannot be improved.

Calcium stearate is a non-ionic surface active agent and it compensates the defect of an anionic surface active agent, namely the defect that it cannot wet all the materials. Moreover, calcium stearate is very effective as a dispersant because of its high wetting and swelling activity, and since it has an effect of gelling silicic acid in a solution, it manifests a characteristic action of increasing the viscosity of a treated soil abruptly after lapse of a certain time and setting the soil. In short, calcium stearate has an effect of setting and solidifying soils stably. It is known that ordinary non-ionic surface active agents prevent cohesion of particles in a liquid and stabilize the gel state. However, if the concentration of a non-ionic surface active agent is enhanced, crosslinking takes place among particles and cohesion is abruptly caused to occur. Accordingly, in general, non-ionic surface active agents are used for removal of impurities suspended in water or clarification of mineral ore muds. Also in the composition of the present invention, calcium stearate exerts the foregoing actions inherent of a non-ionic surface active agent, and it has experimentally been confirmed that calcium stearate can coagulate once precipitated substances to such an extent that re-dispersion is not caused. Moreover, during the operation of hardening soils or deposited sludges, calcium stearate exerts an effect of washing and cleaning particles of clay, silt and the like. To the washed surfaces are adhered cement particles, and therefore, particles of clay, silt and the like are uniformly coagulated and the strength and water-tightness of the treated soil can be remarkably improved.

In the soil-hardening composition of the present invention, if the content of calcium stearate exceeds 0.3% by weight, abnormal coagulation takes place and coagulation advances locally excessively. Accordingly, no uniform coagulating effect can be expected and stable solidification cannot be expected at all. In an extreme case, solidification is not caused at all because of quick setting. If the content of calcium stearate is lower than 0.2% by weight, no sufficient coagulating and setting effect can be obtained. Moreover, if the amount of calcium stearate is larger than 0.3% by weight, monomolecular layers of ions adsorbed on the particle surfaces are broken and hydration of the aluminate phase is abruptly advanced and undesirable quick setting is caused in the soil. If the amount of calcium stearate is smaller than 0.2% by weight, a weak stiffening phenomenon is repeated after pouring of water and the soil is not coagulated.

Sodium tripolyphosphate manifests an action of adsorbing large quantities of cations on negatively charged surfaces of soil particles and enhancing the repulsive force among the soil particles. Therefore, sodium tripolyphosphate improves the effect of dispersing soil particles. When sodium polyphosphate is added to a natural soil in which divalent or trivalent cations are adsorbed and kept in the cohesive state, large quantities of cations are adsorbed on soil particles through negatively charged phsophoric acid groups and the like as media. Accordingly, the dispersing effect can be enhanced. In order to obtain a hardened soil structure having a high strength, it is indispensable that an asymmetric structure of hydrates should be formed. The sodium tripolyphosphate can achieve such reaction because it is an electrolyte having a cation of a small ion radius.

Sodium tripolyphosphate has properties similar to those of the lignin sulfonate, and in addition to the foregoing dispersing effect, sodium tripolyphosphate is expected to exert an effect of reacting with calcium oxide contained in the cement and increasing the strength of the hardened soil structure.

In the soil-hardening composition of the present invention, if the content of sodium tripolyphosphate is lower than 0.4% by weight, the dispersing effect becomes excessively high and it is impossible to obtain a hardened soil structure having a sufficient strength.

In the soil-hardening composition of the present invention, as calcium chloride and silica are incorporated in amounts of at least 1.5% by weight and at least 0.5% by weight, respectively, the water-tightness of the treated soil is enhanced and an effect of promoting setting and hardening can be attained. Moreover, an anticorrosive property can be driven to the treated soil. Still in addition, these components react with other components to attain a neutralizing effect. However, if the amount of calcium chloride is larger than 2.0% by weight or the amount of silica is larger than 1.0% by weight, extreme volume expansion takes place and cracks are formed in the resulting hardened soil structure, and bad influences are brought about by freezing and thawing of the water in these cracks.

When the soil-hardening composition of the present invention is employed, the following effects and advantages can be attained.
(1) Workability of concrete can be improved, and separation or bridging of constituents is prevented.
(2) The efficiency of cement is enhanced by a high dispersing action and the unit amount of water of free state is reduced by the water absorbing property of the composition. Accordingly, the strength and durability of the resulting hardened soil structure can be remarkably improved.
(3) The resistance of soils against freezing and thawing of the water contained therein can be increased.
(4) The water-tightness of soils can be enhanced and the water permeability can be reduced.
(5) The resistance of soils against chemicals such as acids and alkalis can be improved.
(6) The drying shrinkage of soils can be reduced.
(7) It is possible to retard the setting time for a long time without reducing the strength of soils and to shake the soils before the setting.
(8) Since it is possible to moderate reduction of workability after the lapse of time after the kneading, a large-scale construction work can be accomplished conveniently.
(9) Elevation of the temperature of the treated soil can be moderated.

Because of the foregoing characteristic effects and advantages, the composition of the present invention can be used for attaining various purposes in the field of civil engineering works. For example, the composition of the present invention is very effective for modifying and strengthening a surface layer of a super-soft poor subsoil and improving physical and mechanical properties of a cohesive soil having a high water content. Moreover, the composition can be effectively used for hardening a humus soil having a flocculent structure, an alluvial soil and a deposited sludge or the like. Thus, by the use of the soil-hardening agent of the present invention, construction of various soil structures can be remarkably facilitated.

Still further, the composition of the present invention is very advantageous from the economical viewpoint. More specifically, when the composition of the present invention is used, the construction expenses can be saved by 30 to 40% or more over the conventional methods.

An example of the recipe of the composition will now be described.

Composition Example

Additive Components:
  Sodium lignin sulfonate — 0.3% by weight
  Sodium tripolyphosphate — 0.5% by weight
  Calcium stearate — 0.2% by weight
  Calcium chloride — 1.8% by weight
  Slag silica — 0.7% by weight
Main Component (Portland Cement):
  Ignition loss — 3.0% by weight
  Insoluble matter — 0.5% by weight
  $SiO_2$ — 21.5% by weight
  $Al_2O_3$ — 5.0% by weight
  $Fe_2O_3$ — 2.5% by weight
  CaO — 60.0% by weight
  MgO — 1.8% by weight
  $SO_2$ — 2.2% by weight Working examples using the soil-hardening composition of the present invention will now be described. In these examples, the soil properties were determined according the soil test methods specified by the Japanese Association of Soil Engineering.

Working Example 1

The composition of the present invention having a recipe indicated in Composition Example was incorporated in dredged deposited sludge in an amount of 10% by weight based on the sludge, and the mixture was homogeneously blended and naturally aged. When 24 hours had passed, running was possible and a light car could drive on the mixture.

After the lapse of 24 hours, a non-disturbed sample of the mixed soil was picked, and properties were examined to obtain the following results:
  Monoaxial compression strength: 1.0 - 1.5 $Kg/cm^2$
  CBR test value: 2.0 - 5.0%

Working Example 2

The composition of the present invention was incorporated into a soil of Kanto loam formation in an amount of 7% by weight, and the mixture was stirred and blended and the water content was adjusted. The mixed soil was levelled by a tire roller or the like, and it was then naturally aged. The muddy Kanto loam formation soil was set and coagulated, and after 24 hours, a car could drive on the soil.

A non-disturbed sample of the mixed soil was picked after the lapse of 24 hours and properties were examined to obtain the following results:

Monoaxial compression strength: 5.0 - 15.0 Kg/cm$^2$
CBR test value: 5.0 - 15.0%

Working Example 3

The composition of the present invention, which was stirred and blended in a milky state by a mixing agitator attached to a floating structure, was incorporated into a soil of an alluvium deposite which could not be excavated by an excavator or other machine, whereby a chemically treated artificial ground was formed. The amount of the composition of the present invention incorporated in the soil was 7% by weight. After 46 hours, the so formed ground could be cut in a depth of about 6.0 m from the surface of the ground, and when the slope gradient was about 45°, the slope could retain its shape by itself. A non-disturbed sample was picked from the treated soil after the lapse of 46 hours and properties were examined to obtain the following results:

Monoaxial compression strength: 7.0 - 10.0 Kg/cm$^2$

What is claimed is:

1. A composition to be added to soil to harden said soil consists essentially of Portland cement which has incorporated therein 2.0 to 0.8% by weight of lignin sulfonate having a molecular weight of 400 to 700,000, 0.4 to 0.5% by weight of sodium tripolyphosphate, 0.2 to 0.3% by weight of calcium stearate, 1.5 to 2.0% by weight of calcium chloride and 0.5 to 1.0% by weight of a slag silica.

2. The composition of claim 1 which contains 0.2 to 0.5% by weight of at least one member selected from the group consisting of alkylarylsulfonates, calcium aluminate and triethanolamine ester.

3. A composition to be added to soil to harden said soil consists essentially of about 96.5% Portland cement, 0.2 to 0.8% by weight of lignin sulfonate having a molecular weight of 400 to 700,000, 0.4 to 0.5% by weight of sodium tripolyphosphate, 0.2 to 0.3% by weight of calcium stearate, 1.5 to 2.0% by weight of calcium chloride and 0.5 to 1.0% by weight of a slag silica.

4. A method of treating soil to improve its physical and mechanical properties comprises adding to said soil an effective amount of the composition of claim 1.